US007111765B1

(12) United States Patent
Blakley

(10) Patent No.: US 7,111,765 B1
(45) Date of Patent: Sep. 26, 2006

(54) CARRIER RACK SYSTEM

(76) Inventor: Michael C. Blakley, 920 Quince Ave., Boulder, CO (US) 80304

( * ) Notice: Subject to any disclaimer, the term of this patent is extended or adjusted under 35 U.S.C. 154(b) by 445 days.

(21) Appl. No.: 10/165,859

(22) Filed: Jun. 7, 2002

Related U.S. Application Data

(60) Provisional application No. 60/297,195, filed on Jun. 7, 2001.

(51) Int. Cl.
*B60R 9/08* (2006.01)
*B60R 9/10* (2006.01)
*B60R 9/12* (2006.01)

(52) U.S. Cl. .................. 224/506; 224/508; 224/519; 224/924; 414/462; 414/465; 414/508; 414/917

(58) Field of Classification Search ........ 224/504–506, 224/502, 512, 519, 924, 518, 497, 499, 521, 224/507, 508; 414/462, 465, 466, 557, 917
See application file for complete search history.

(56) References Cited

U.S. PATENT DOCUMENTS

| | | | | | |
|---|---|---|---|---|---|
| 1,515,242 | A | * | 11/1924 | Dexter | 108/134 |
| 2,492,841 | A | * | 12/1949 | Burkey | 414/462 |
| 2,636,549 | A | * | 4/1953 | Geller | 248/240.2 |
| 3,717,271 | A | * | 2/1973 | Bergman, Jr. | 414/463 |
| 4,021,070 | A | * | 5/1977 | Shea | 296/19 |
| 4,100,858 | A | * | 7/1978 | Bue et al. | 108/48 |
| 4,136,622 | A | * | 1/1979 | Bue et al. | 108/48 |
| 4,685,860 | A | * | 8/1987 | McFarland | 414/720 |
| 4,813,584 | A | * | 3/1989 | Wiley | 224/510 |
| 5,209,628 | A | * | 5/1993 | Hassell | 414/462 |
| 5,527,146 | A | * | 6/1996 | Allsop et al. | 414/462 |
| 5,547,116 | A | * | 8/1996 | Eckhart | 224/509 |
| 5,730,345 | A | * | 3/1998 | Yeckley et al. | 224/505 |
| 5,791,857 | A | * | 8/1998 | Ziaylek et al. | 414/462 |
| 5,971,241 | A | * | 10/1999 | Allen et al. | 224/497 |
| 6,039,228 | A | * | 3/2000 | Stein et al. | 224/532 |
| 6,092,972 | A | * | 7/2000 | Levi | 414/462 |
| 6,149,039 | A | * | 11/2000 | Englander | 224/310 |
| 6,164,896 | A | * | 12/2000 | Cummins | 414/462 |
| 6,413,033 | B1 | * | 7/2002 | Monroig, Jr. | 414/480 |

* cited by examiner

*Primary Examiner*—Stephen K. Cronin
(74) *Attorney, Agent, or Firm*—Berkeley Law & Technology Group

(57) ABSTRACT

A trailer hitch mounted recreational equipment carrier for transporting various recreational equipment. The trailer hitch mounted recreational equipment carrier includes a support frame having at least a horizontal member and a vertical member, a first link arm pivotally coupled to the horizontal member, and a second link arm pivotally coupled to the vertical member. The second link arm may be a different length than the first link arm. The recreational equipment carrier also includes a crossbar support frame pivotally coupled to the first and second link arms to provide a pivotal motion geometry that facilitates the crossbar support being pivotally moved from a substantially vertical position to a substantially horizontal position.

6 Claims, 3 Drawing Sheets

CARRIER RACK SYSTEM

RELATED APPLICATION

The present patent application claims benefit of priority to U.S. Provisional Patent Application No. 60/297,195, entitled SPORT CARRIER RACK SYSTEM, filed Jun. 7, 2001, which is hereby fully incorporated by reference.

FIELD OF INVENTION

The present invention relates to the field of utility carrier systems for vehicles. More specifically, the invention relates to a carrier rack system that is attachable to rear of vehicles.

BACKGROUND OF THE INVENTION

A method of transporting recreational equipment is to mount the recreational equipment on a type of carrier system attached to a vehicle. One type of carrier system may be attached to the top of the vehicle, and accordingly, may be known as a roof rack style system, or more commonly, a roof rack. In order to facilitate mounting of the recreational equipment onto the roof rack, the roof rack may comprise of two bars that are placed perpendicular to the length of the vehicle along the top. One of the bars is placed towards the front of the vehicle and the other is placed towards the back. The bars may be attached to the vehicle by towers that attach to the vehicle while holding the bars. The roof rack style system facilitates mounting and transporting various recreational equipment.

For example, where the sports equipment may be a bicycle, the two bars of the roof rack may be utilized to place a bicycle component, such as, for example, a bicycle tray, between the two bars. Commonly, the bicycle tray holds the bicycle in place, which in turn, facilitates mounting of the bicycle onto the roof rack. For example, where the recreational equipment may be a pair of skis, the two bars of the roof rack may each have a ski carrier component, through which, skis may be held in place. Accordingly, utilizing the roof rack style system facilitates transportation of various recreational equipment, including storage carriers that may transport various types of cargo. Additionally, combinations of various recreational equipment may be transported on the roof rack style system at one time (i.e., bicycle, skis, and a canoe may all be transported at once utilizing various components). However, having a carrier system on top of a vehicle has several disadvantages.

One disadvantage of a carrier system on top of a vehicle is that mounting recreational equipment on the roof of a vehicle may be difficult because of its location on top of the vehicle. For example, placing one or more bicycles on top of the roof of a vehicle may be awkward and difficult because of a bicycle's weight, size, and/or shape. Additionally, if the vehicle's roof is high off the ground, mounting recreational equipment onto the carrier may be difficult because of the height the recreational equipment is required to be lifted. For example, some larger vehicles, commonly known as sport utility vehicles, trucks, and vans, have roofs that are high off the ground making mounting recreational equipment onto the carrier difficult.

Another disadvantage of transporting recreational equipment on roof rack style systems is that the recreational equipment may extend above the vehicle increasing the vehicle's clearance. For example, a vehicle having a recreational equipment such as a bicycle may not be able to drive into many car ports, garages, and the like because of the risk of damage to buildings, recreational equipment, and/or the vehicle. Additionally, transporting recreational equipment on roof rack style systems reduces aerodynamics of the vehicle by increasing drag, which in turn, may decrease fuel efficiency.

Another type of carrier system that attaches to a vehicle may be a rear attached carrier system. The rear attached carrier system may be attached to the vehicle by coupling the carrier system with a trailer hitch, and accordingly, may be known as a hitch mounted style system. The hitch mounted style system couples to the receiver of the hitch, and a vertical post having a clamping style system extends behind the vehicle. For example, where the sports equipment may be a bicycle, the bicycle's top tube is clamped by the carrier system resulting in the bicycle being positioned perpendicular to the length of the vehicle. The hitch mounted style systems are lower to the ground, which in turn, makes it easier to mount recreational equipment. However, these hitch mounted style systems have several disadvantages.

One disadvantage of hitch mounted style carrier systems is that, for the example of bicycles, if more than one bicycle is to be transported, the bicycles are required to be "nested". That is, a first bicycle is required to be placed on a clamping system closest to the rear of the vehicle, and subsequent bicycles are required to be placed parallel to the first bicycle in layers extending away from the rear of the vehicle. Because the bicycles are nested, often times, removing a bicycle closest to the rear of the vehicle requires the removal of the other bicycles on the carrier system. Having the bicycles clamped on the top tube in the nested fashion allows the bicycles to rotate about the top tube and shift during travel, which in turn, may cause damage to adjacent bicycles. Additionally, a larger number of modern bicycles are designed with suspension systems, and as a result, lack the required top tubes to facilitate mounting.

Another disadvantage of hitch mounted style carrier system is that access to the rear compartment of the vehicle is restricted because the carrier systems extend vertically close to the rear doors of the vehicle. Even though some hitch mounted style carrier systems facilitate pivoting away from the rear door of the vehicle to provide access, because the manner in which the bicycles are mounted on the hitch, as previously described, moving the hitch mounted style carrier systems around is difficult. Additionally, hitch mounted style carrier systems do not facilitate versatility in mounting various recreational equipment utilizing various components or combinations thereof.

Thus, a recreational equipment carrier that addresses at least some of the above disadvantages of systems is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials, and configurations are set forth in order to provide a thorough understanding of the present invention. However, it will be apparent to one skilled in the art that the present invention may be practiced without specific details. In other instances, well known features are omitted or simplified in order not to obscure the present invention.

References throughout this specification to "one embodiment" or "an embodiment" means that a particular feature, structure, or characteristic described in connection with the embodiment is included in at least one embodiment of the invention. Thus, appearances of the phrases "in one embodiment" or "in an embodiment" in various places throughout this specification are not necessarily all referring to the same embodiment of invention. Furthermore, the particular features, structures, or characteristics may be combined in any suitable manner in one or more embodiments.

In various embodiments of the invention, improved versatility and ease of use of a recreation equipment carrier system that attaches to the rear of a vehicle is facilitated. This and other advantages will be evident from the disclosure.

Figure 1:
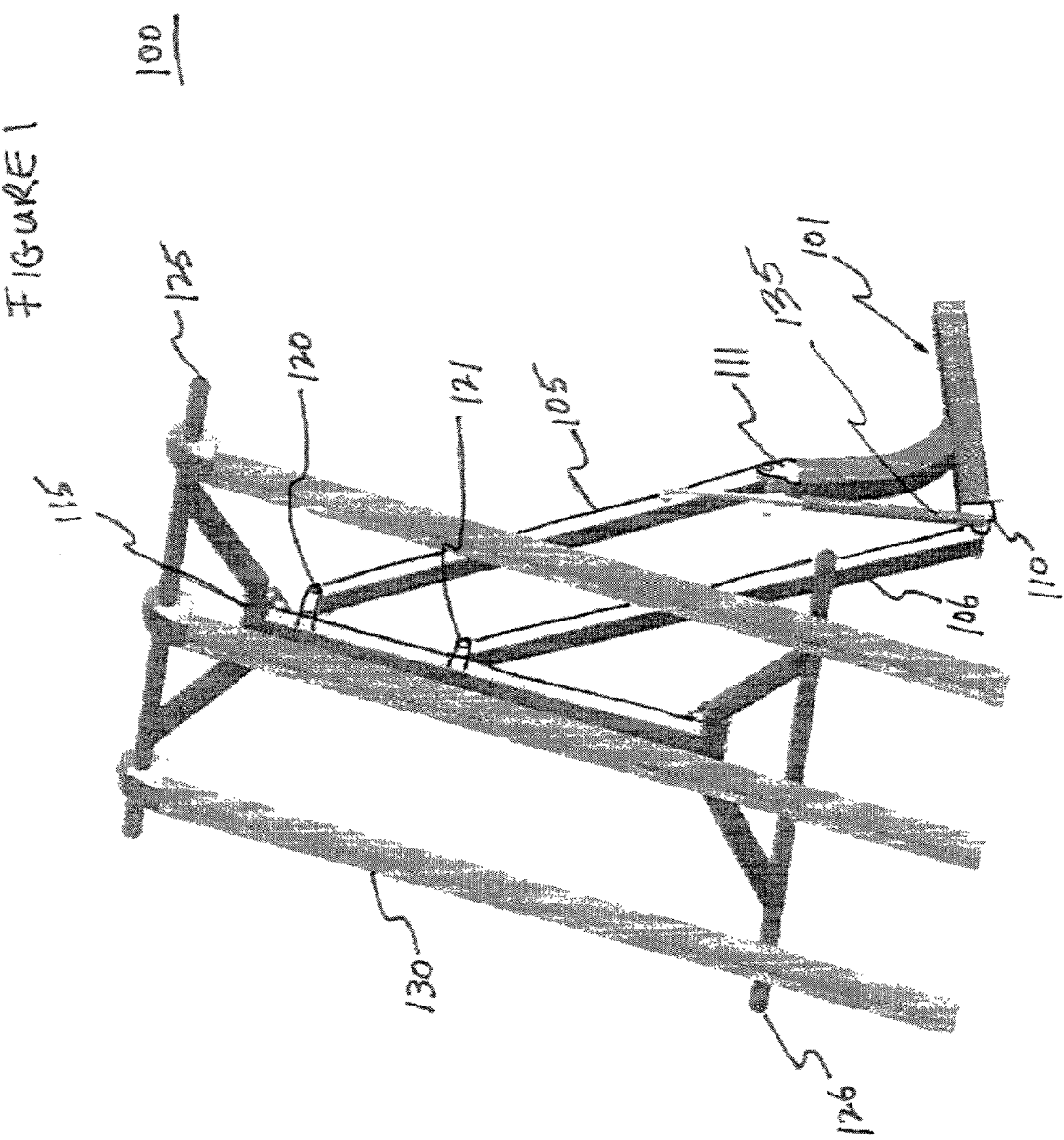
FIG. 1 illustrates a perspective view of a recreational equipment carrier system according to one embodiment of the present invention.

FIG. 1 illustrates a perspective view of a recreational equipment carrier system according to one embodiment of the present invention. Illustrated in FIG. 1 is a recreational equipment carrier system, hereinafter, carrier 100, that may be easily mounted at the rear of a vehicle (shown as ref. 201 in FIG. 2). Further, a number of sports equipment, such as bicycles, may be mounted onto and removed from the carrier 100 with improved ease of use over the prior art. The carrier 100 includes a number of components.

Figure 2:
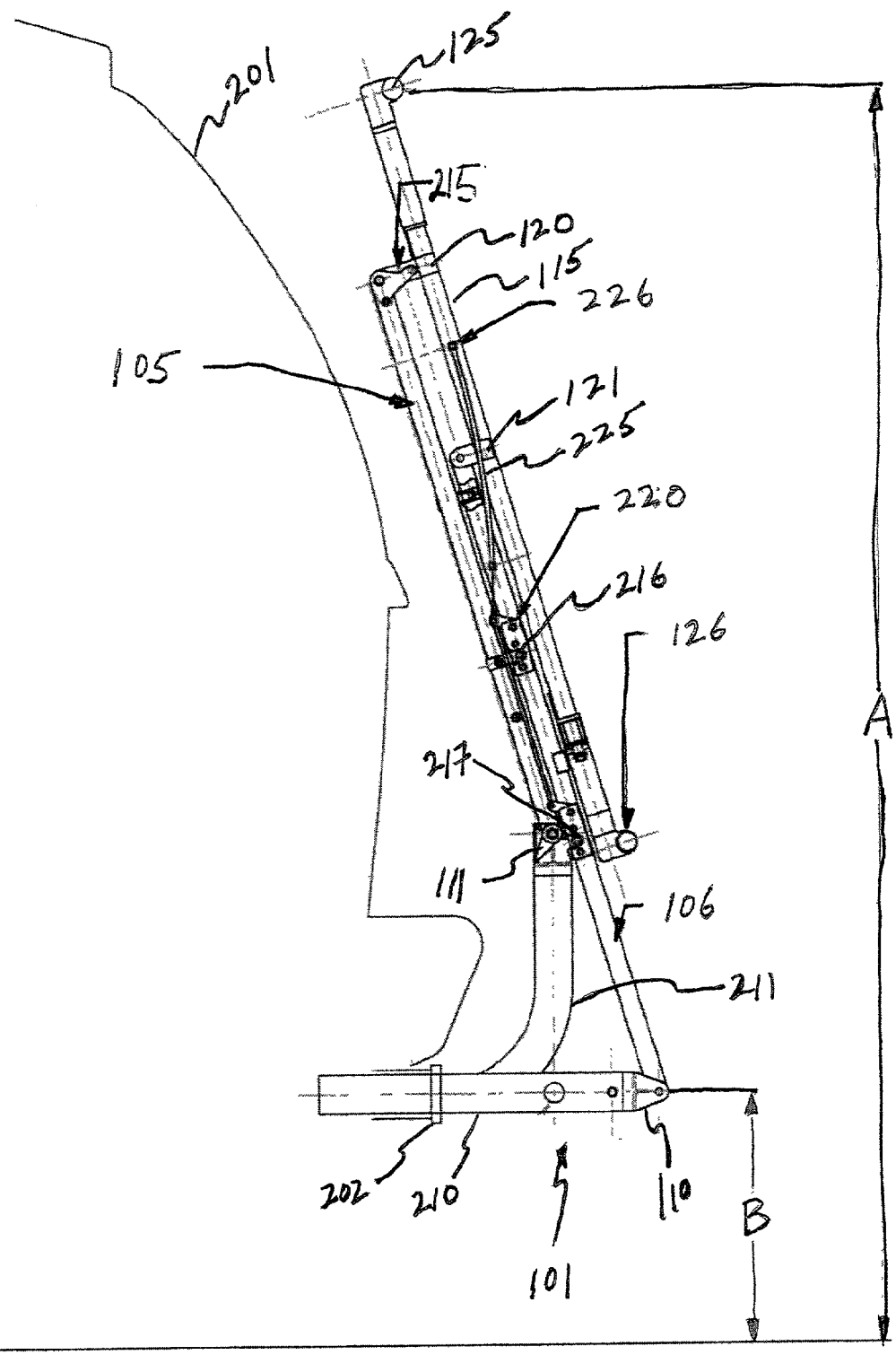
FIG. 2 illustrates a side view of the carrier of FIG. 1 in a folded up position, in accordance with one embodiment of the present invention.

The carrier 100 includes a support frame 101 to facilitate coupling a receiver of a trailer hitch (shown as ref. 202 in FIG. 2). Carrier 100 also includes a first and second link arms 105–106 that are coupled to the support frame 101 at a first pivot mount 110 and a second pivot mount 111, respectively, as shown. In the illustrated embodiment, the first link arm 105 is shorter in length than the second link arm 106. As will be described in further detail, the difference in length between the first link arm 105 and the second link arm 106 facilitates folding up and folding down of the carrier 100 (in a direction towards and away from the vehicle). Additionally, carrier 100 includes a crossbar support frame 115 that is coupled to the first and second link arms 105–106 at a third and fourth pivot mount 120–121, respectively. As shown, the third pivot mount 120 is located on the end of the first link arm 105 opposite the second pivot mount 111. The fourth pivot mount 121 is located on the end of the second link arm 106 opposite the first pivot mount 110. A piston 135 is attached to the first link arm 105 and the first pivot mount 110. As will be described in further detail, the link arms 105–106, the pivot mounts 110–111 and 120–121, and the support frame 101 operate advantageously to fold the carrier 100 up and down (towards and away from the vehicle). Additionally, the piston 135 facilitates ease with which the folding up and folding down may be performed.

Carrier 100 includes a first crossbar 125 and a second crossbar 126 that are attached at opposite ends of the crossbar support frame 115, upon which, exemplary recreational components 130 may be attached. The first and second crossbars 125 may be of any type of crossbars that are used to for carrying recreational equipment, such as, but not limited to, round bars available from Yakima Products, Inc. of Arcata, Calif.

The number of components that make up the carrier 100 may be made of high strength materials, such as, but not limited to, steel, titanium, aluminum, and so forth based at least upon the different requirements for the carrier. For example, if the carrier 100 is used in an area of high corrosion, such as coastal areas, a higher corrosion resistant material may be used. Additionally, references may be made to bars throughout the disclosure. However, for the purposes of describing the present invention, it should be appreciated that bars may refer to any structural member, such as, but not limited to, tubes, and the like, and does not necessarily refer to a solid member. Accordingly, the bars may be referred generically referred to as member.

The carrier 100 illustrated in FIG. 1, facilitates versatility of utilizing various recreational equipment components, such as, for example, ski components, bicycle components, carriers, etc., and any combination thereof. Additionally, the carrier 100 facilitates ease of use because of the manner in which the carrier 100 folds up and down.

FIG. 2 illustrates a side view of the carrier of FIG. 1 in a folded up position, in accordance with one embodiment of the present invention. As illustrated in FIG. 2, the carrier 100 is coupled to a trailer hitch receiver 202 of the rear of a vehicle 201, which in turn, advantageously provides a reduced affect on the aerodynamics of the vehicle 201 as compared to roof mounted rack systems. As shown, the carrier 100 is coupled to the trailer hitch receiver by inserting the support frame 101 of the carrier 100 into the trailer hitch receiver 202. The folded up position may at least be utilized when transporting recreational equipment.

As detailed in FIG. 2, the support frame 101 comprises of a horizontal bar 210 and a vertical bar 211 forming an inverted substantially "T" like structure. The horizontal bar 210 includes the first pivot mount 110 attached to the opposite end of the trailer hitch receiver 202. The vertical bar 211 includes the second pivot mount 111 attached to its end (i.e., at the top of the inverted substantially "T" like structure.

In the embodiment illustrated in FIG. 2, the first link arm 105 includes a first latch pin 215 located where the first link arm 105 is coupled to the third pivot mount 120, and a second latch pin 216 that is located approximately one third of the way up the length of the first link arm 105. A third latch pin 217 is located at the second pivot mount 111.

Additionally, a first latch 220 is located approximately two thirds of the way up the second link arm 106 to latch with the second latch pin 216. A second latch 221 is located approximately one third of the way up the second link arm 106 to latch with the third latch pin 217. A cable 225 is coupled to the first and second latches 220–221, and a latch release 226 is coupled to the cable 225. As will be described in further detail below, the latches 220–221 and the latch pins 215–217 facilitate locking of the carrier 100 in both the folded up position and the folded down position.

Locking the carrier 100 in the two positions advantageously prevents unwanted motion of the carrier 100, which in turn, provides a safety mechanism. For example, in FIG. 2, the carrier 100 may be locked in the folded up position may be utilized for transportation of recreational equipment. In the folded up position, the first and second latches 220–221 are engaged with the second and third latch pins 216–217 resulting in the carrier 100 being locked in the folded up position. Additionally, locking the carrier 100 in the folded up position, as shown in FIG. 2, provides a compact profile that advantageously does not extend very far beyond the rear of the vehicle 201.

In order to release the latches, the latch release 226 may be utilized to apply a tension onto the cable 225 resulting in the first and second latches 220–221 releasing the second and third latch pins 216–217.

In one embodiment, the latches 220–221 may be rotary latches, and accordingly, the latch pins 215–217 may be rotary latch pins.

Also illustrated in FIG. 2, is a first dimension A and a second dimension B. The first dimension A may be the distance from the ground to the first cross bar 125 providing an indication of overall folded up height of the carrier 100. The second distance B may be the distance from the ground to the support frame 101 providing an indication of ground clearance for the carrier 100. Accordingly, in one embodiment, the first dimension A may be 64.941 inches, and the second dimension B may be 13.00 inches. It should be appreciated by one skilled in the art, that the dimensions may vary within the scope of the invention.

Figure 3:
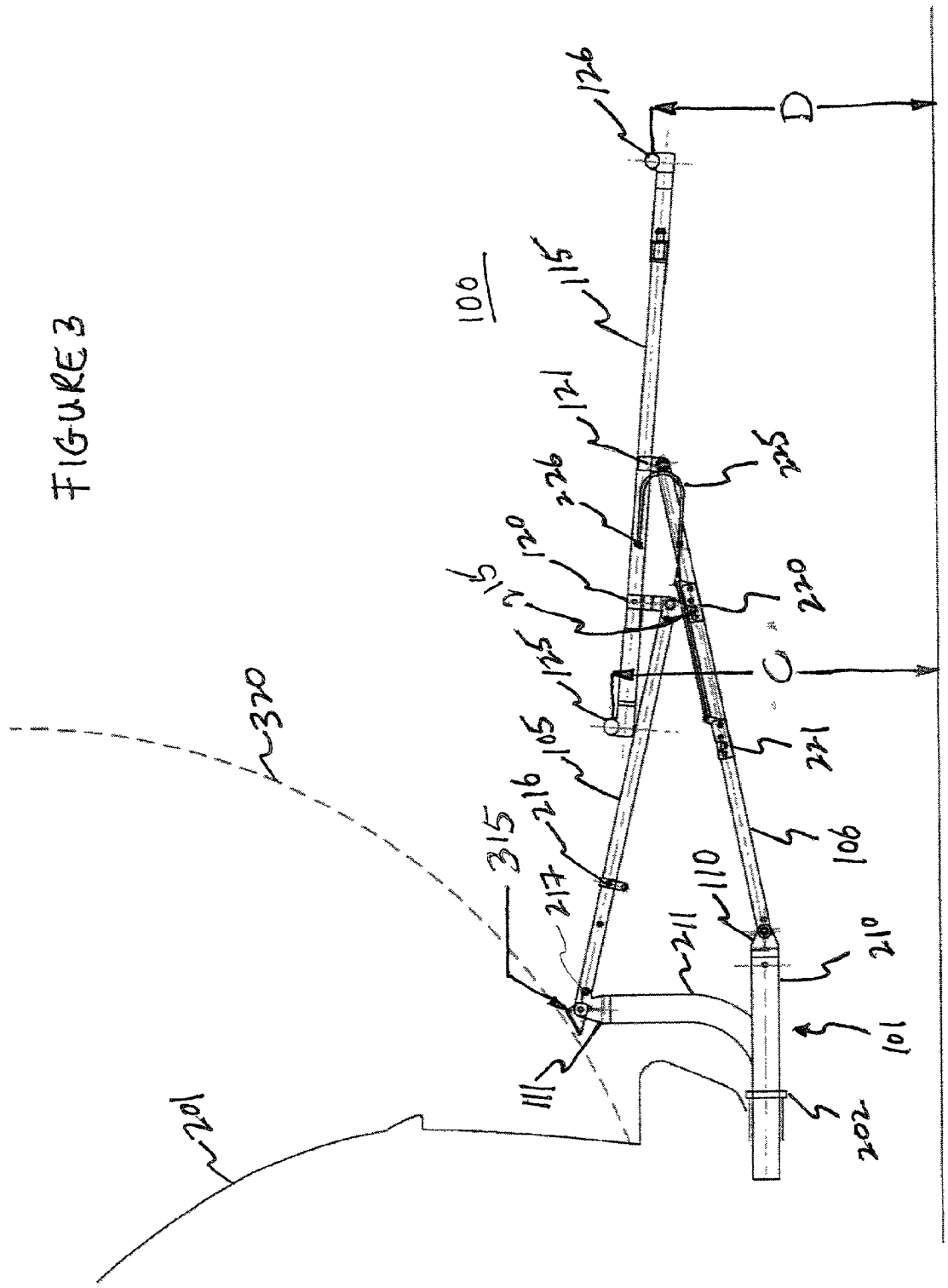
FIG. 3, wherein the carrier 100 is illustrated being in a folded down position, in accordance with one embodiment of the present invention.

Referring now to FIG. 3, wherein the carrier 100 is illustrated being in a folded down position, in accordance with one embodiment of the present invention. As illustrated in FIG. 3, the carrier 100 in the folded down position, which may at least be utilized when mounting recreational equipment or gaining access to the rear compartment of the vehicle, in accordance with the teachings of the present invention. However, in certain situations, it may be desirable to transport recreational equipment with the carrier 100 in the folded down position. For example, during a bicycle race, a support vehicle may transport spare bicycles with the carrier folded down for quick and easy access to the bicycles. For the purposes of describing the present invention, it will be assumed that transportation of recreational equipment does not occur when the carrier 100 is in the folded down position. However, it could be, under other embodiments of the present invention.

As illustrated in FIG. 3, when the carrier 100 is in the folded down position, the crossbar support frame 115, having the crossbars 125–126, advantageously rotates into a substantially horizontal position. Because the carrier 100 operates to rotate the crossbar support frame 115 into the folded down position, the crossbars 125–126 are at a level that advantageously facilitates easy mounting of recreational equipment and/or recreational equipment components.

As alluded to earlier, folding of the carrier from the folded up position of FIG. 2 to the folded down position of FIG. 3, is facilitated by a pivoting motion geometry as a result of the different lengths between the first link arm 105 and the second link arm 106 being coupled to several pivot mounts 110–111 and 120–121. Accordingly, from the folded up position of FIG. 2, the user releases the latches 220–221 by applying a operating the latch release 226. The user pulls the second crossbar 126 away from the rear of the vehicle 201. As the second crossbar 126 swings out and pivots about the link arms 105–106, while the shorter link arm 105 pulls the first crossbar 125 down toward the ground. Once the first latch pin 215 engages the first latch 220, as shown in FIG. 3, the carrier 100 is in the proper folded down position of FIG. 3. The described pivoting motion geometry may be easily performed due to the pivot mount piston 135 (shown in FIG. 1), where the piston acts as a counterbalance to the weight of the carrier in motion.

The folded down position of the carrier 100 facilitates access to the rear compartment of the vehicle 201. As illustrated by a dotted arc 320, if for example, the vehicle 201 is equipped with a lift style back door, such as those commonly found on mini-vans, the carrier 100 is advantageously designed in such a manner as to facilitate the opening and closing of the lift style back door. Additionally, if for example, the vehicle 201 is equipped with a drop down style tailgate, such as those commonly found no pickup trucks, the carrier 100 is advantageously designed in such a manner as to facilitate the opening and closing of the lift style back door by providing a tailgate support pad 315.

In the illustrated embodiment of FIG. 3, a third dimension C and a fourth dimension D is also shown. The third dimension C may be the distance from the ground to the first crossbar 125 providing an indication of overall folded down height of the carrier 100. The fourth distance D may be the distance from the ground to the second crossbar 126 providing an indication of how far the recreational equipment needs to be lifted for mounting onto the carrier 100. Accordingly, in one embodiment, the third dimension C may be 24.067 inches, and the fourth dimension D may be 20.669 inches. It should be appreciated by one skilled in the art, that the dimensions may vary within the scope of the invention.

As a result, referring now to FIGS. 1–3, improved carrier rack system facilitates versatility and ease of use, in accordance with teachings of the present invention.

While the methods and apparatuses of the present invention have been described in terms of the above-illustrated embodiments, those skilled in the art will recognize that the various aspects of the present invention are not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
   a support frame having at least a horizontal member and a vertical member;
   a first link arm pivotally coupled to the horizontal member;
   a second link arm pivotally coupled to the vertical member, the second link arm being a different length than the first link arm;
   a crossbar support frame pivotally coupled to the first and second link arms to provide a pivotal motion geometry that facilitates the crossbar support frame being pivotally moved between a substantially vertical position and a substantially horizontal position relative to the support frame;
   a first latch pin disposed on the first link arm substantially in a location where the first link arm is pivotally coupled to the horizontal member;
   a second latch pin disposed at a predetermined location on the first link arm; and
   a third latch pin disposed at a predetermined location on the vertical member.

2. The apparatus of claim 1 further comprising:
   a first latch disposed at a predetermined location to facilitate coupling of the first latch with the second latch pin when the crossbar support frame is in the substantially vertical position; and
   a second latch disposed at a predetermined location to facilitate coupling of the second latch with the third latch pin when the crossbar support frame is in the substantially vertical position, wherein the coupling of the first latch and the second latch pin and the second latch with the third latch pin facilitates locking of the crossbar support in the substantially vertical position.

3. The apparatus of claim 1 further comprising a latch disposed at a predetermine location to facilitate coupling of the latch with the first latch pin when the crossbar support frame is in the substantially horizontal position.

4. A method comprising:
   pivotally coupling a first link arm to a horizontal member of a support frame;
   pivotally couple a second link arm to a vertical member of the support frame, said second link arm being a different length than the first link arm;
   pivotally coupling a crossbar support frame to the first and the second link arms to provide a pivotal motion geometry to move the crossbar support frame relative to the support frame between a substantially vertical position and a substantially horizontal position;
   providing a first latch pin on the first link arm substantially in a location where the first link arm is pivotally coupled to the horizontal member;
   providing a second latch pin at a predetermined location on the first link arm; and
   providing a third latch pin at a predetermined location on the vertical member.

5. The method of claim 4 further comprising:
   providing a first latch at a predetermined location to facilitate coupling of the first latch with the second latch pin when the crossbar support frame is in the substantially vertical position; and
   providing a second latch at a predetermined location to facilitate coupling of the second latch with the third latch pin when the crossbar support frame is in the substantially vertical position, wherein the coupling of the first latch and the second latch pin and the second latch with the third latch pin facilitates locking of the crossbar support in the substantially vertical position.

6. The method of claim 4 further comprising providing a latch at a predetermined location to facilitate coupling of the latch with the first latch pin when the crossbar support frame is in the substantially horizontal position.

* * * * *